United States Patent

Leifer et al.

[15] 3,666,057

[45] May 30, 1972

[54] FLOATING DAMPER ASSEMBLY

[72] Inventors: Noel Arthur Leifer, Pine Brook; Eugene Charles Schramm, Mountain Lakes, both of N.J.

[73] Assignee: Bell Telephone Laboratories, Incorporated, Murray Hill, N.J.

[22] Filed: Dec. 28, 1970

[21] Appl. No.: 101,476

[52] U.S. Cl. .................................... 188/1 B, 188/83, 310/51
[51] Int. Cl. .......................................................... F16f 7/06
[58] Field of Search .................. 74/574; 188/1 B, 83; 310/51; 336/100; 415/119

[56] References Cited

UNITED STATES PATENTS 2,655,049  10/1953  Cole ................................... 188/1 B X
3,207,014  9/1965  Carlstedt ............................. 188/1 B X

FOREIGN PATENTS OR APPLICATIONS 502,286  7/1930  Germany ............................... 188/1 B

*Primary Examiner*—Duane A. Reger
*Attorney*—R. J. Guenther and Kenneth B. Hamlin

[57] ABSTRACT

A floating damper assembly for applying a constant damping torque to a motor shaft exhibiting substantial runout comprises a flexible cable element, which is anchored at its ends to the motor housing, and a floating damper, which is attached to the cable element substantially at the element's center, further including an appropriately shaped bushing of frictional material and means for radially loading the bushing against the shaft. The floating damper assembly is particularly useful in an incremental stepping motor whose step profile must remain relatively constant and free of excessive ringing or overshoot.

5 Claims, 2 Drawing Figures

Patented May 30, 1972

3,666,057

INVENTORS N. A. LEIFER
E. C. SCHRAMM
BY
J. P. Kearns
ATTORNEY

3,666,057

FLOATING DAMPER ASSEMBLY

FIELD OF THE INVENTION

This invention relates to torsional vibration damping devices and in particular to such devices which apply a constant damping torque to the motor shaft exhibiting substantial runout.

BACKGROUND OF THE INVENTION

Devices for damping torsional vibrations of a shaft are well known in the art. However, many such prior art devices are hard mounted to a frame or housing, thereby exhibiting, in the presence of shaft runout (departure from trueness or concentricity), undesirable variations in the frictional damping torque as a function of the shaft's angular displacement.

Torsional vibration damping devices find particular application in incremental stepping motors whose shafts tend to oscillate around positions of rest. Such shaft oscillations result from the moments of inertia of the shaft and of the driven parts; therefore, the shaft does not immediately come to a standstill but oscillates for some time around the nominal position of rest. These oscillations disadvantageously affect the step profile of the incremental stepping motor.

It is therefore an object of this invention to provide a torsional vibration damping device which exhibits a substantially constant damping torque independently of angular displacement.

It is another object of this invention to provide a torsional vibration damping device which exhibits a substantially constant damping torque even in the presence of shaft runout.

It is a further object of this invention to provide a torsional vibration damping device for controlling the step profile of an incremental stepping motor.

SUMMARY OF THE INVENTION

According to the present invention, a floating damper assembly for damping torsional vibrations of a shaft comprises a flexible cable element, which is anchored at its ends, and a floating damper, which is attached to the cable element substantially at its center. A substantially constant damping torque is thereby applied to the shaft.

According to an illustrative embodiment of the invention, a floating damper assembly for damping torsional vibrations of a motor shaft comprises a flexible cable element, which is anchored at its ends to the motor housing, and a floating damper, which is attached to the cable element substantially at the element's center, further including a split carbon bushing and means for spring loading the bushing against the motor shaft.

It is an advantage of this invention that it comprises relatively few parts and thus is easy to assemble.

It is a feature of this invention that it simultaneously provides translational displacement flexibility and rigid tangential restraint.

DESCRIPTION OF THE DRAWING

The above and other objects, advantages and features of this invention will be better appreciated by a consideration of the following detailed description and the drawing in which.

DETAILED DESCRIPTION

Figure 1:
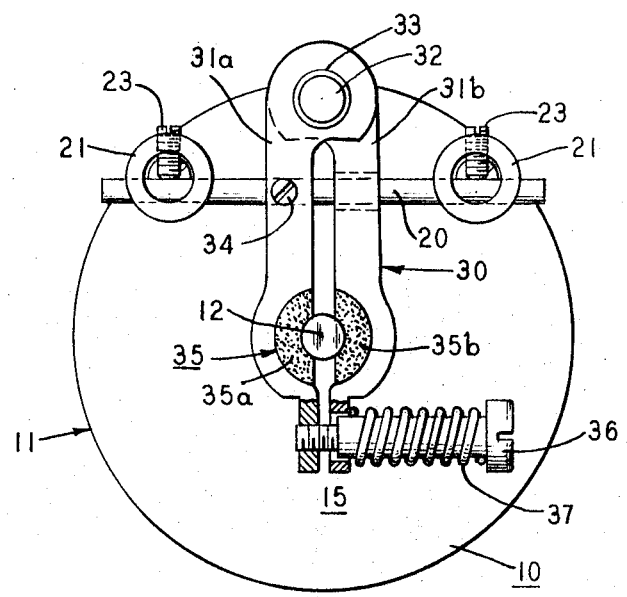
FIG. 1 is a partially fragmentary front view of a floating damper assembly according to the present invention.
Figure 2:
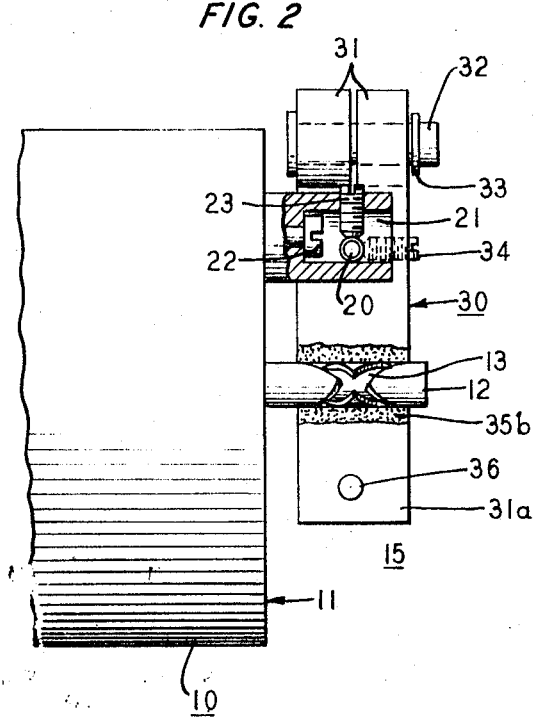
FIG. 2 is a partially fragmentary side view of the floating damper assembly of FIG. 1 illustrating how the assembly is anchored to the motor housing and showing the oppositely sensed helical grooves on the motor shaft.

FIG. 1 is a front view of a floating damper assembly according to the present invention, In the given case, floating damper assembly 15 is utilized to damp the torsional vibrations of shaft 12, which is part of motor 10. Motor 10, which could be an incremental stepping motor, further comprises housing 11. Assembly 15 comprises cable element 20 and floating damper 30. Cable element 20 simultaneously provides translational displacement flexibility in a direction perpendicular to its axis and rigid tensional restraint along its axis. Cylindrical anchors 21, anchor screws 22, and set screws 23 rigidly fix the ends of cable element 20 to housing 11. FIG. 2 shows in detail how screws 22 attach anchors 21 to housing 11.

The length and diameter of cable element 20, and the nominal tension therein, are determined by the particular application.

Floating damper 30 further comprises two-segment housing 31 and split carbon bushing 35 wherein segments 31a and 31b are respectively associated with bushings 35a and 35b. Bushing 35, which is advantageously made of carbon but can be any appropriately shaped frictional material, substantially surrounds shaft 12. Stud 32 and its associated retaining ring 33 secure segments 31a and 31b. It should be noted that segments 31a and 31b can rotate relative to each other, stud 32 being the center of rotation. In addition, set screw 34 attaches segment 31a of housing 31 to cable element 20 substantially at the center of the element. Note that stud 32 has no direct connection to housing 11, as is more apparent from FIG. 2.

It has been found advantageous to provide oppositely sensed helical grooves 13 on the part of shaft 12 which is in contact with carbon bushing 35 for carrying away carbon residue particles that result from wear.

Floating damper 30 additionally comprises means for radially loading bushing 35 against shaft 12 including threaded stud 36 and resilient means such as circular coil spring 37. It is apparent that the radial force applied by bushing 35 to shaft 12 is increased by further threading stud 36 into section 31a of housing 31, since the compressive force within spring 37 simultaneously increases. The net radial force applied to shaft 12 by carbon bushing 35 results in a net retarding frictional torque on shaft 12. Therefore, any oscillatory energy imparted to shaft 12 is damped by this retarding frictional torque. Note that any desired frictional torque can easily be selected during the process of assembly. The adjustability of the spring compression has the further advantage that subsequent regulation of the frictional torque after a period of operation is possible in case such appears necessary.

It is apparent that mechanical fastening means other than those heretofore mentioned can be utilized to assemble the floating damper assembly according to the present invention.

As mentioned before, the step profile of an incremental stepping motor should remain relatively constant and free of excessive ringing or overshoot. It should also be recalled that prior art torsional vibration damping devices exhibit undesirable variations in the frictional damping torque when motor shaft runout is present. However, according to the present invention, by mounting floating damper 30 on cable element 20, considerable vertical translational displacement flexibility is provided by cable element 20 to floating damper 30. Cable element 20 additionally provides tensional restraint which reacts to the frictional damping torque applied by bushing 35 to shaft 12. It is therefore apparent that the usual detrimental effects resulting from shaft runout are overcome by the translational displacement flexibility afforded floating damper 30. In conclusion, the floating damper assembly of the present invention is particularly useful in incremental stepping motors for controlling the step profile, even in the presence of substantial shaft runout.

While the arrangement according to this invention for applying a constant damping torque to a rotating shaft has been described in terms of a specific illustrative embodiment, it will be apparent to one skilled in the art that many modifications are possible within the spirit and scope of the disclosed principle.

What is claimed is:

1. A device for applying a constant damping torque to a shaft exhibiting substantial runout, said device comprising:
    a flexible cable element rigidly anchored at its ends such that a perpendicular line through the center of said cable element passes through the nominal center of rotation of said shaft, and a floating damper attached to said cable element substantially at the element's center for applying a constant damping torque to said shaft.

2. The device of claim 1 wherein said floating damper further comprises an appropriately shaped bushing of frictional material and means for radially loading said bushing against said shaft.

3. The device of claim 2 wherein said loading means is an adjustable spring loading means for selecting the desired damping torque.

4. The device of claim 3 wherein said bushing is a carbon bushing and said shaft contains oppositely sensed helical grooves in contact with said carbon bushing for carrying away residue particles resulting from wear of said carbon bushing.

5. A floating damper assembly for applying a constant damping torque to a motor shaft exhibiting substantial runout comprising:

a flexible cable element rigidly anchored at its ends to the motor housing such that a perpendicular line through the center of said cable element passes through the nominal center of rotation of said shaft, and a floating damper attached to said cable element substantially at the element's center for applying a constant damping torque to said shaft, said floating damper including an appropriately shaped bushing of frictional material and means for adjustably loading said bushing against said motor shaft.

* * * * *